United States Patent
Fassbender et al.

(10) Patent No.: US 7,521,662 B1
(45) Date of Patent: Apr. 21, 2009

(54) PORTABLE HANDHELD ARTIFICIAL LIGHT DETECTOR

(75) Inventors: William J. Fassbender, Watertown, CT (US); Philip H. Mudge, Brookfield, CT (US); Brian P. Platner, 100 Trailwood Dr., Guilford, CT (US) 06437

(73) Assignee: Brian P. Platner, Lyme, CT (US)

( * ) Notice: Subject to any disclaimer, the term of this patent is extended or adjusted under 35 U.S.C. 154(b) by 5 days.

(21) Appl. No.: 11/874,434

(22) Filed: Oct. 18, 2007

Related U.S. Application Data (63) Continuation of application No. 10/819,518, filed on Apr. 6, 2004, now Pat. No. 7,288,755, which is a continuation-in-part of application No. 10/277,180, filed on Oct. 18, 2002.

(60) Provisional application No. 60/345,874, filed on Oct. 19, 2001.

(51) Int. Cl.
    *H03F 3/08* (2006.01)
(52) U.S. Cl. .................. 250/214 A; 250/221; 250/206; 250/554; 340/557; 340/577; 340/578; 348/208.1; 348/208.5
(58) Field of Classification Search .................. 250/221, 250/214 R, 206, 554; 340/577, 578, 557; 348/208.1, 208.5
    See application file for complete search history.

(56) References Cited

U.S. PATENT DOCUMENTS

| | | | |
|---|---|---|---|
| 3,940,753 A | 2/1976 | Müller | |
| 4,079,388 A | 3/1978 | Takahama et al. | |
| 4,220,412 A | 9/1980 | Shroyer et al. | |
| 4,420,686 A | 12/1983 | Onoguchi et al. | |
| 4,587,459 A | 5/1986 | Blake | |
| 4,672,194 A * | 6/1987 | Kastendieck et al. .. | 250/214 VT |
| 4,827,119 A | 5/1989 | Gaboury | |
| 5,037,198 A | 8/1991 | Gaboury | |
| 5,498,865 A | 3/1996 | Gaboury et al. | |
| 5,586,048 A | 12/1996 | Coveley | |
| 5,598,000 A | 1/1997 | Popat | |
| 5,611,918 A | 3/1997 | Markham | |
| 5,990,628 A | 11/1999 | Birrell | |
| 6,066,843 A | 5/2000 | Scheremeta | |
| 6,396,040 B1 | 5/2002 | Hill | |
| 6,688,368 B2 * | 2/2004 | Kovach et al. ........... | 160/84.02 |
| 6,750,953 B1 * | 6/2004 | Douglas .................. | 250/208.5 |

FOREIGN PATENT DOCUMENTS

JP 11-326043 11/1999

OTHER PUBLICATIONS

Non-Final Office Action for U.S. Appl. No. 11/874,451, mailed May 14, 2008.
Final Office Action for U.S. Appl. No. 11/874,451, mailed Oct 21, 2008.

* cited by examiner

*Primary Examiner*—Seung C Sohn
(74) *Attorney, Agent, or Firm*—Jones Day; Garry J. Tuma (57) ABSTRACT

A portable, handheld artificial light detector distinguishes artificial light from sunlight and identifies low-frequency artificial light from high-frequency artificial light. Artificial light includes light from a lamp powered by an AC source. Low frequency light includes, for example, light produced by a magnetic luminaire ballast, while high frequency light includes light produced by an electronic luminaire ballast.

20 Claims, 12 Drawing Sheets

PORTABLE HANDHELD ARTIFICIAL LIGHT DETECTOR

CROSS REFERENCE TO RELATED APPLICATIONS

This is a continuation of commonly assigned U.S. patent application No. 10/819,518, filed Apr. 6, 2004, now U.S. Pat. No. 7,288,755, which is a continuation-in-part of U.S. patent application No. 10/277,180, filed Oct. 18, 2002, which claims the benefit of U.S. Provisional Application No. 60/345,874, filed Oct. 19, 2001.

BACKGROUND OF THE INVENTION

This invention relates to artificial light detectors. More particularly, this invention relates to portable, handheld artificial light detectors that can distinguish artificial light from sunlight and low-frequency artificial light from high-frequency artificial light.

As used herein, artificial light is modulated light such as from a lamp powered by an AC source. Examples of such lamps include incandescent, fluorescent, and high intensity discharge lamps. As also used herein, "luminaire" refers to a lighting fixture that outputs modulated light or that has one or more lamps powered by an AC source. "Artificial light" does not include light from a device powered by a DC source, such as, for example, a battery-operated flashlight or typical automobile headlight.

Sunlight refers to light from the sun and may also be referred to as natural light, daylight, and outside light.

Light detectors are known and typically include a photocell circuit or device that responds either when there is a sudden change in light level or when there is an absolute light level change. In addition to turning lamps on and off in response to the amount of ambient sunlight detected in a monitored area, light detectors can also be used to track the amount of time that luminaires are on in a monitored area. This information can be used to determine energy costs associated with those luminaires. Such costs can be significant in large office, warehouse, and retail areas. However, many known light detectors cannot distinguish artificial light from sunlight. Thus, these known light detectors cannot be used to determine energy costs in areas that receive sunlight, because they cannot accurately indicate whether or not the luminaires in those areas are on or off during daylight hours.

Furthermore, few, if any, known light detectors can identify types of artificial light. Different types of artificial light have different energy costs. For example, artificial light from a low-frequency source (e.g., an incandescent bulb or fluorescent lamp powered by a magnetic ballast) generally has higher energy costs than artificial light from a high-frequency source (e.g., a fluorescent lamp powered by an electronic ballast). Thus, light detectors capable of identifying types of artificial light could be used to identify luminaires whose replacement may lower energy costs.

Lastly, light detectors that can distinguish artificial light from sunlight and identify types of artificial light would be even more advantageous if they were portable and could be handheld. An auditor can then quickly and easily survey an area without having to access and inspect each luminaire or group of luminaires in order to determine what type of artificial light is generated.

In view of the foregoing, it would be desirable to be able to provide a light detector that can distinguish artificial light from sunlight.

It would also be desirable to be able to provide a light detector that can identify types of artificial light.

It would further be desirable to be able to provide a portable, handheld light detector that can distinguish artificial light from sunlight and identify types of artificial light.

SUMMARY OF THE INVENTION

It is an object of this invention to provide a light detector that can distinguish artificial light from sunlight.

It is also an object of this invention to provide a light detector that can identify types of artificial light.

It is further an object of this invention to provide a portable, handheld light detector that can distinguish artificial light from sunlight and identify types of artificial light.

In accordance with this invention, an artificial light detector is provided that includes a photoelectric device that responds to intensity changes in received light at about the same rate as the rate of those changes (i.e., converts light energy to electrical energy having about the same frequency as the light energy). The detector also includes an electrical signal filter that rejects substantially DC signals converted from received sunlight or light from a DC source and that passes AC signals converted from received artificial light.

Methods of responding to received light are also provided, which include determining whether the received light is from a lamp, the sun, or both, and then either activating a device in response to receiving light of sufficient intensity from a lamp or preventing activation of a device in response to receiving light from only the sun or light of insufficient intensity from a lamp. As used herein, "lamp" refers to a device that outputs artificial light.

Furthermore, the invention provides a portable, handheld artificial light detector that can identify types of artificial light based on the frequency of the detector light. Methods of identifying types of artificial light are also provided.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 5b is a circuit diagram of an equivalent circuit of the circuit of FIG. 5a.

DETAILED DESCRIPTION OF THE INVENTION

The invention provides a light detector that can distinguish artificial light from sunlight. Sunlight is substantially unmodulated except for some slight variations caused by clouds, etc. Artificial light (as used herein) is modulated. For example, an incandescent lamp powered by a 60 hertz source produces light varying in intensity 120 times per second (i.e., light intensity peaks twice each cycle, once in the positive portion of the waveform and once in the negative portion of the waveform). The same is true of a fluorescent lamp having a magnetic ballast. Newer electronic ballasts have switching frequencies of about 20 to 50 kilohertz that produce light intensity variations of about 40 to 100 kilohertz. In sum, artificial light is modulated and sunlight is substantially not. Analogously, artificial light can be thought of as AC (alternating current), while sunlight can be thought of as DC (direct current).

Figure 1:
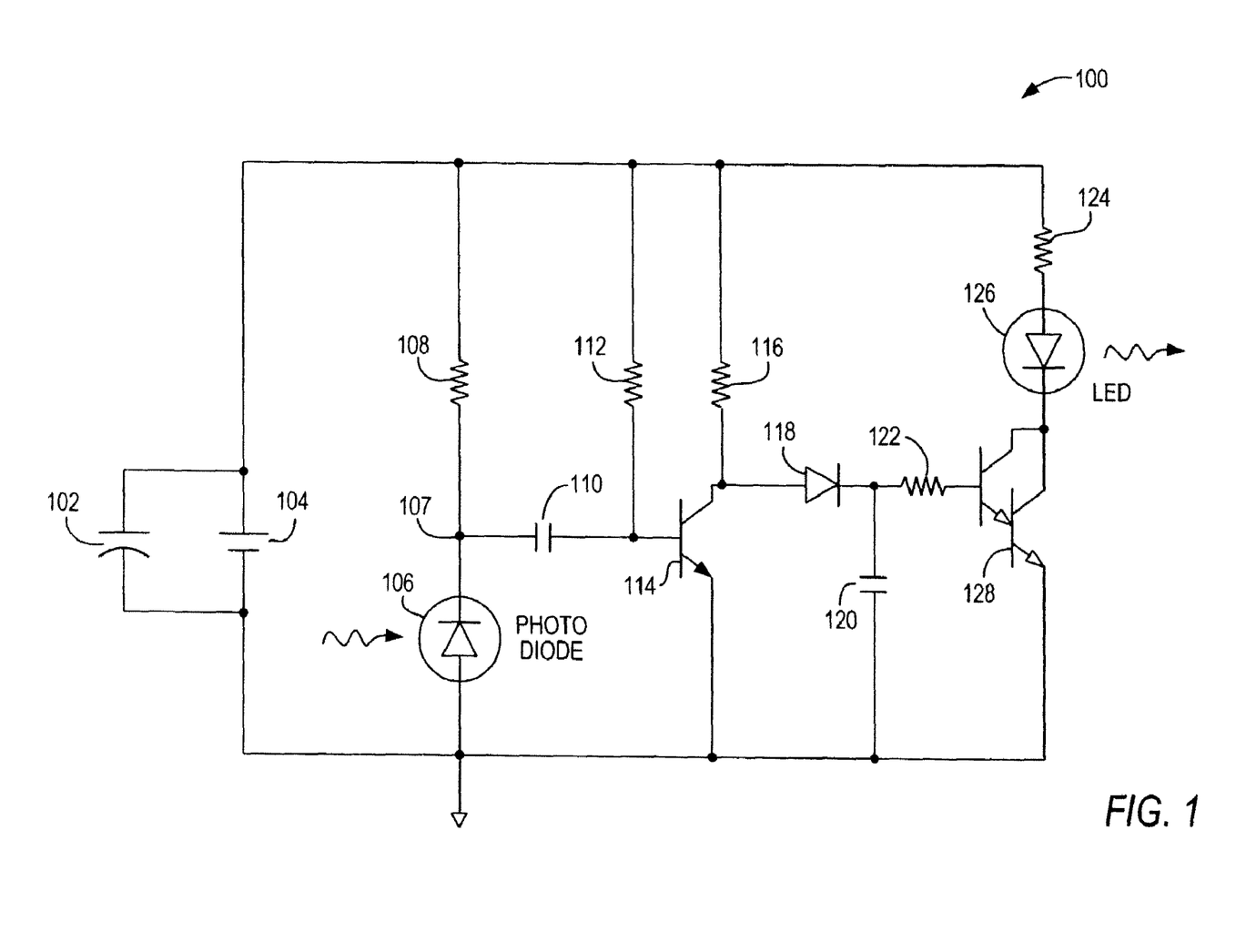
FIG. 1 is a circuit diagram of a first embodiment of a light detector according to the invention.

FIG. 1 shows artificial detector circuit 100 in accordance with the invention. Circuit 100 preferably includes capacitors 102, 110, and 120; voltage source 104; photodiode 106; resistors 108, 112, 116, 122, and 124; NPN transistor 114; diode 118; NPN Darlington pair 128; and light emitting diode (LED) 126. Voltage source 104 is preferably a 3 volt lithium battery and alternatively can be of other values and source types. Capacitor 102 is preferably about 500 µf and is used to lower the voltage source impedance, which is particularly important when LED 126 is switching on. Capacitor 110 is preferably about 0.022 µf, and capacitor 120 is preferably about 0.001 µf. Resistor 108 is preferably about 4.7k ohms, resistor 112 is preferably about 4.7M ohms, resistor 116 ohms is preferably about 27k ohms, resistor 122 is preferably about 470k ohms, and resistor 124 is preferably about 1k ohms. Transistor 114 is preferably a general purpose "2222" transistor (or equivalent), and Darlington pair 128 is preferably an "A13". Alternatively, other values of resistors and capacitors and types of transistors can be used.

Circuit 100, which can be thought of as a frequency response circuit, operates preferably as follows: photodiode 106 absorbs and converts received light into a current proportional to the intensity of the light. As the intensity increases, more current conducts through photodiode 106, which operates in reverse bias mode. As more current conducts through photodiode 106, node 107 is pulled closer to ground. If the received light is from the sun, or has sufficiently slow intensity changes, photodiode 106 produces a substantially constant (i.e., DC) or slowly changing current. Accordingly, capacitor 110 isolates node 107 from the rest of circuit 100 (as is known, capacitors appear as open circuits to DC and as short circuits to AC). Thus, the voltage at the base of transistor 114 (via resistor 112) keeps transistor 114 on (i.e., conductive), which keeps the anode of diode 118 at or near ground. This keeps Darlington pair 128 off, which prevents current from flowing through LED 126, keeping it off. Circuit 100 therefore ignores sunlight. The same output (LED 126 off) results when no light is received by photodiode 106.

When received light is from an artificial light source (e.g., a fluorescent incandescent, or high intensity discharge lamp), which has rapid intensity transitions (e.g., at least 120 times/sec), photodiode 106 produces an AC current whose frequency is at least about 120 Hz. Assuming that the artificial light is of sufficient intensity, the AC current through photodiode 106 modulates the voltage at node 107 from about or at source voltage to about or at ground. Capacitor 110 couples the modulating voltage at node 107 to the base of transistor 114. This turns transistor 114 off and on at or near the frequency of the produced AC current. The voltage at the anode of diode 118 now modulates from about or at source voltage to about or at ground, feeding pulses to Darlington pair 128. Accordingly, Darlington pair 128 would turn on and off, causing LED 126 to turn on and off very rapidly. However, capacitor 120 keeps Darlington pair 128 on during the negative portion of each cycle, thus preventing LED 126 from flickering on and off while circuit 100 receives modulated light. LED 126 thus maintains constant illumination while artificial light is received by circuit 100. Note that the values of resistor 112 and capacitor 110 determine the low frequency cutoff value of circuit 100.

In sum, LED 126 represents an output device controlled by the amount and type of light received by circuit 100. If no light or only sunlight is received by circuit 100, LED 126 is off. If artificial light is received, LED 126 is on (i.e., illuminated)—provided that (1) the intensity of the light received by photodiode 106 is sufficient to produce an AC current amplitude that can pull down the voltage at node 107 enough to turn transistor 114 off, and that (2) the frequency of the light received is sufficiently high to allow the modulated voltage at node 107 to be coupled through capacitor 110 to the base of transistor 114. Thus, circuit 100 has two thresholds, a frequency threshold and an intensity threshold. Received light accordingly needs to meet both in order to illuminate LED 126.

In other embodiments of the invention, circuit 100 can be coupled to, or LED 126 can be replaced with, other devices or circuits (with appropriate circuit modifications as needed), such as, for example, a data logger than can record the amount of time that lamps are on in an area covered by circuit 100.

Figure 2:
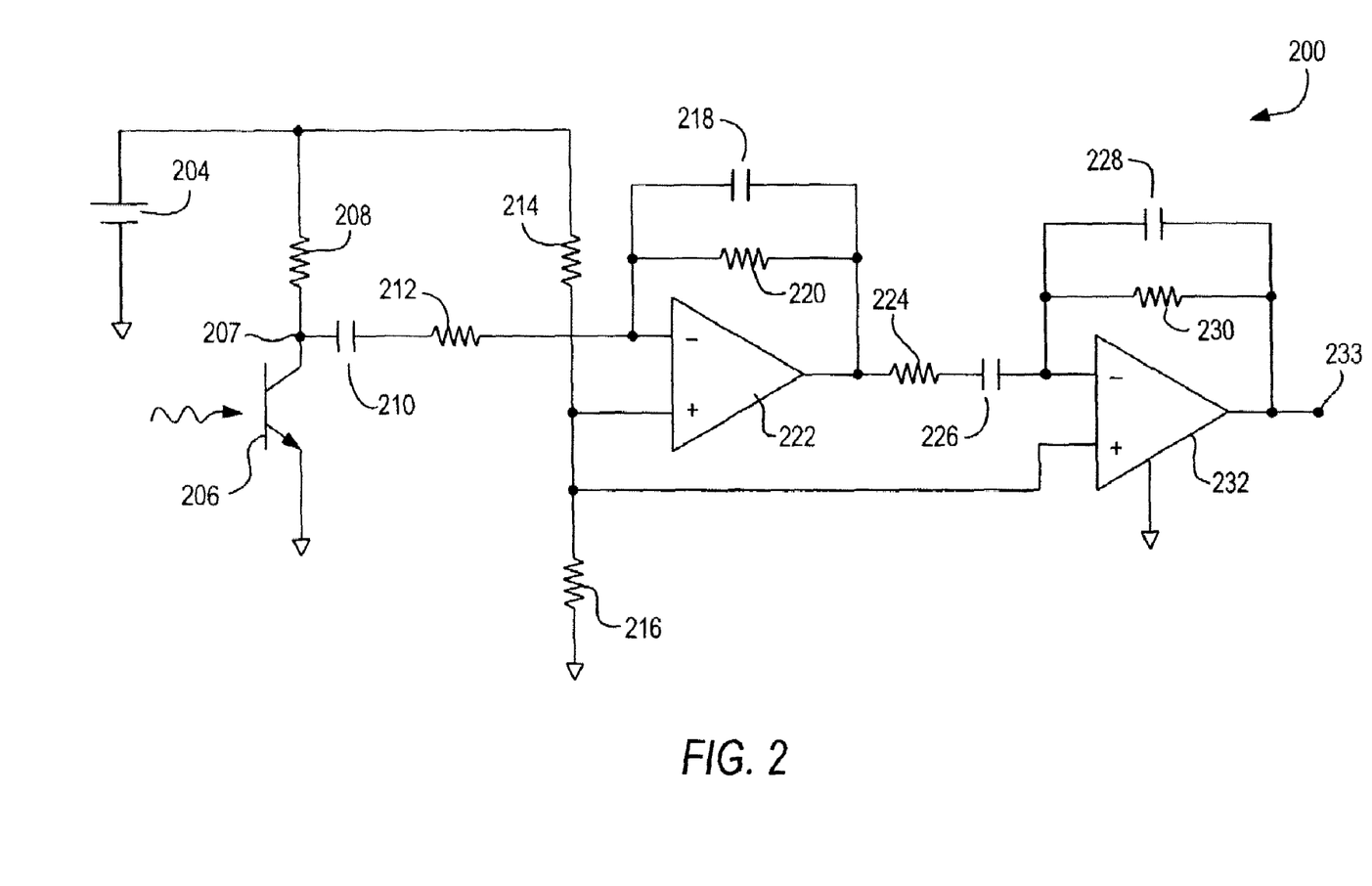
FIG. 2 is a circuit diagram of a second embodiment of a light detector according to the invention.

FIG. 2 shows light detector circuit 200 in accordance with the invention. Circuit 200 has a greater range than circuit 100 (i.e., circuit 200 can detect light from sources at greater distances from the circuit than can circuit 100). Circuit 200 preferably includes voltage source 204; photo-transistor 206; resistors 208, 212, 214, 216, 220, 224, and 230; capacitors 210, 218, 226, and 228; op-amps 222 and 232, and output node 233. Photo-transistor 206 operates similarly to photodiode 106; however, photo-transistor 206 also provides signal gain (e.g., 100x). Voltage source 204 is preferably a 3 volt lithium battery, but can be of other values and source types. Resistors 214 and 216 form a voltage divider that provide substantially equal voltages to the non-inverting inputs of op-amps 222 and 232, which can be "LMV358" type op-amps. Op-amps 222 and 232, capacitors 218, 226, and 228, and resistors 220, 224, and 230 form a two-stage bandpass filter. The values of capacitors 210, 218, 226, and 228 and resistors 212, 220, 224, and 230 determine the passband and stopband of the filter (i.e., the frequencies which pass through the filter and those which are attenuated by the filter).

Circuit 200, which also distinguishes artificial light from sunlight, operates preferably as follows: photo-transistor 206 absorbs received light and conducts current (i.e., turns on) proportionally to that light. As photo-transistor 206 turns on, the voltage at node 207 is pulled towards ground. If the light received by photo-transistor 206 is of substantially constant or slowly changing intensity (e.g., sunlight), the resulting voltage at node 207 isolated from the rest of circuit 200 by capacitor 210. Thus, the voltage at the inverting input of op-amp 222 is a DC value (set by the voltage divider of resistors 214 and 216). Capacitor 226 appears as an open circuit to the DC output of op-amp 222, thus isolating op-amp 232 from the rest of circuit 200. Accordingly, the voltage signal at output node 233 is a DC signal at or near the bias voltage set by the voltage divider. Preferably, the bias voltage is at about one half the value of source voltage 204 (unless, of course, a particular application requires the output to be at a different value). The same output results when no light is received by photo-transistor 206.

When light received by photo-transistor 206 is artificial (e.g., light from a lamp, modulated light, light having cyclic intensities), photo-transistor responds accordingly by turning on and off, resulting in an AC voltage at node 207. This AC voltage is then coupled by capacitor 210 to the inverting input of op-amp 222. The resulting AC output of op-amp 222 is coupled through capacitor 226 to the inverting input of op-amp 232, and the output signal at node 233 is now an AC waveform.

In sum, circuit 200 rejects received light below a frequency determined by the values of the relevant capacitors and resistors. Accordingly, those values can be chosen, for example, to accept light frequencies produced by incandescent lamps and fluorescent lamps having either magnetic or electronic ballasts and to reject all others (e.g., that of sunlight). Alternatively, for example, circuit 200 can be constructed to accept only those higher light frequencies produced by a lamp having an electronic ballast and to reject all others.

Similar to circuit 100, circuit 200 also has two thresholds that received light should meet in order for circuit 200 to indicate a "lamps on" condition—a frequency threshold (as described above) and an intensity threshold. If the intensity of the received light absorbed by photo-transistor 206 is not high enough to sufficiently turn on photo-transistor 206, the voltage at node 207 will not be modulated enough to cause circuit 200 to output an AC waveform of sufficient magnitude, resulting in a substantially DC output, which indicates a "lamps off" condition.

Output node 233 can be preferably coupled to any appropriate device or circuit (e.g., a comparator, data logger, etc.) that can receive the two different types of output (AC and DC) for distinguishing artificial light from sunlight or for distinguishing higher frequency artificial light from both sunlight and lower frequency artificial light.

Note that although circuit 100 included a photodiode and circuit 200 included a photo-transistor, other types of photoelectric devices, such as, for example, a photo-resistor, can be used in accordance with the invention. (A photo-resistor has a resistance that varies with the intensity of the light received; the higher the intensity, the lower the resistance.)

Figure 3:
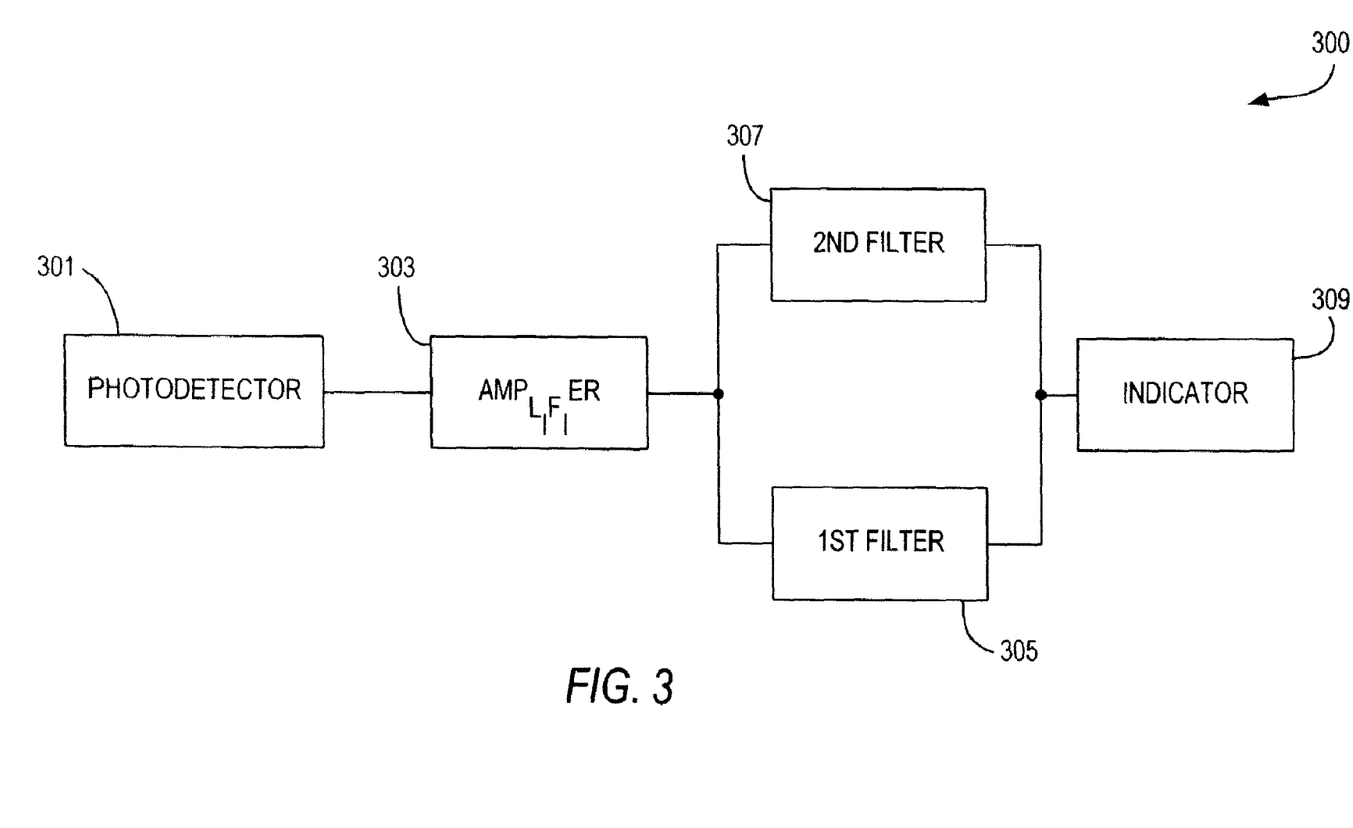
FIG. 3 is a block diagram of a third embodiment of a light detector according to the invention.

FIG. 3 shows a light detector 300 in accordance with the invention. Light detector 300 advantageously distinguishes artificial light from sunlight and can identify two types of artificial light. For example, detector 300 can be constructed to identify whether artificial light is low frequency or high frequency. This information can then be used to determine whether or not energy savings can be realized by, for example, upgrading an existing lighting system from luminaires with magnetic ballasts to luminaires with electronic ballasts. Advantageously, artificial light can be quickly identified with detector 300 without having to remove a luminaire's access panels and inspecting its internal components.

Light detector 300 includes a photodetector 301, an amplifier 303, a first filter 305, a second filter 307, and an indicator 309. Photodetector 301 converts received light to an electrical signal having either an alternating current (AC) component, a direct current (DC) component, or both. In some embodiments, photodetector 301 outputs only the AC component of the electrical signal converted from the received light, thus ignoring any DC component from received sunlight or a DC light source. Amplifier 303 amplifies the electrical signal received from photodetector 301. Substantially concurrently, first and second filters 305 and 307 filter the amplified signal received from amplifier 303. First and second filters 305 and 307 preferably filter the received signal based on frequency. For example, they may each be a bandpass, low pass, high pass, stopband, or notch filter. Accordingly, filters 305 and 307 can be constructed to detect light of various frequencies or frequency ranges. Moreover, more than two parallel filters can be included in detector 300 in order to detect more than two types of light. First and second filters 305 and 307 may additionally or alternatively filter out a DC component of an amplified signal (assuming, for example, that the photodetector had not already performed this function), and they may additionally or alternatively filter the amplified signal in any other desired manner. Indicator 309 receives signals passed by first and second filters 305 and 307 and accordingly indicates the type of light detected. Indicator 309 may include one or more indication devices, such as, for example, LEDs, sound devices, or any other devices capable of identifying the type of light detected. Preferably, detector 300 is powered by a self-contained, portable energy source.

Figure 4:
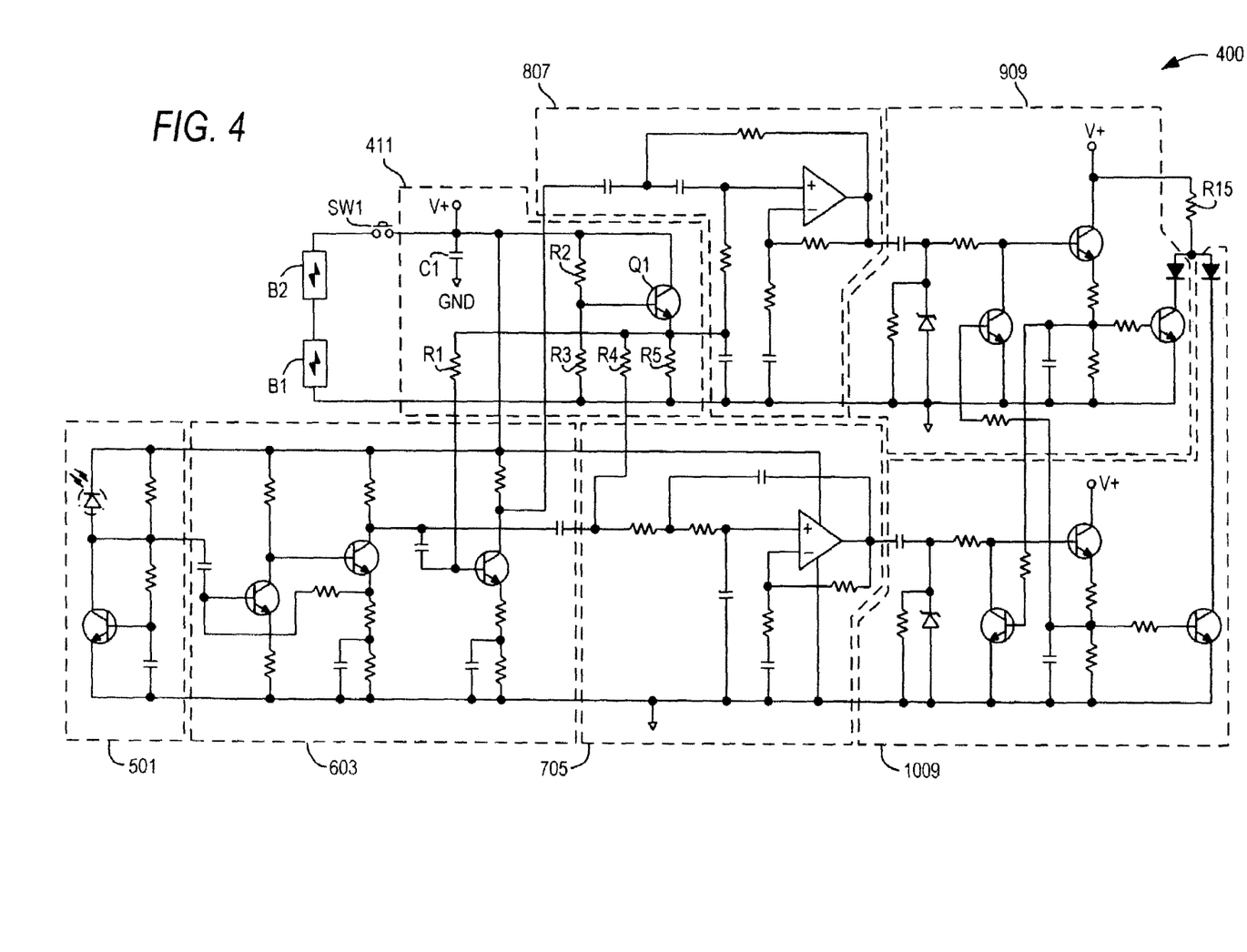
FIG. 4 is a circuit diagram of a fourth embodiment of a light detector according to the invention.

FIG. 4 shows another circuit embodiment of a light detector in accordance with the invention. Light detector circuit 400 preferably includes a manually-operated switch SW1 and a self-contained, portable energy source, which in this embodiment is two 1.5 volt double A batteries B1 and B2. Alternatively, other types of energy sources or numbers and types of batteries can be used. Circuit 400 also preferably includes bias network 411, which generates bias voltages and includes capacitor C1, node V+, NPN transistor Q1, and resistors R1, R2, R3, R4, and R5. In one embodiment of the invention, Q1 is a "2222" type transistor, C1 is about 0.068 μf, R1 is about 750k ohms, R2 is about 470k ohms, and R3, R4, and R5 are each about 1M ohm. When switch SW1 is closed, node V+ is at a voltage at which circuit 400 is operative. Circuit 400 further preferably includes photodetector 501, amplifier 603, low pass filter 705, bandpass filter 807, indicator 909, indicator 1009, and resistor R15.

Figure 5A:
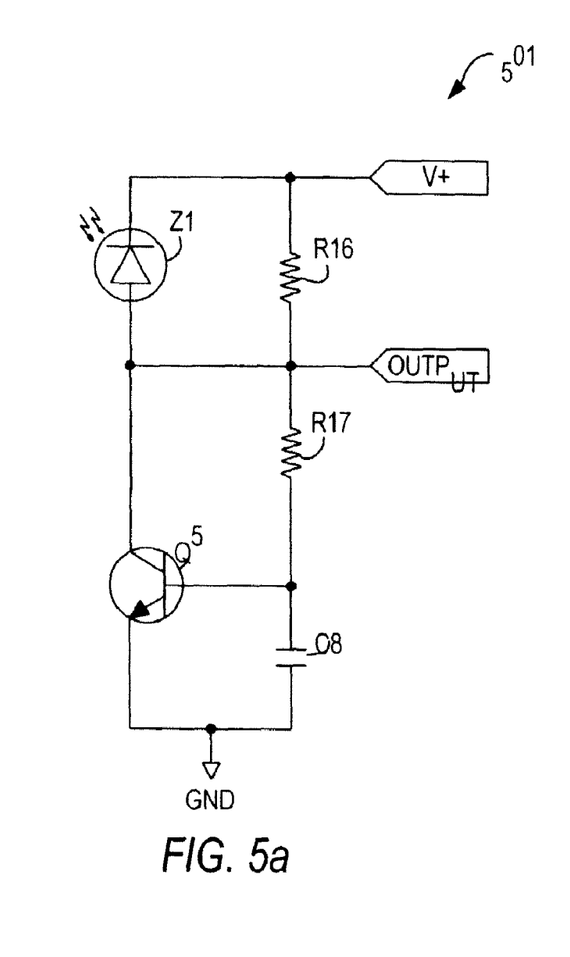
FIG. 5a is a circuit diagram of a first portion of the circuit of FIG. 4.

FIG. 5a shows photodetector 501, which includes a photodiode Z1, NPN transistor Q5, resistors R16 and R17, and capacitor C8. Photodiode Z1 operates in reverse bias mode. When light strikes the photodiode, it converts the light's energy into an electrical signal whose current is proportional to the amount of light received. That light may be from an AC source, a DC source, or combinations of both. Photodetector 501 advantageously preserves the desired AC component of the generated electrical signal and removes the DC component as follows: Sunlight or light from a DC source hitting photodiode Z1 produces a constant current. Part of this current flows through resistor R17 and the base-emitter junction of transistor Q5, causing the transistor to turn on, whereupon the balance of the current flows through Q5's collector-emitter junction. When transistor Q5 reaches equilibrium, the collector-emitter voltage is preferably about 0.55 volts. Thus, substantially no DC component is passed on to amplifier 603 (moreover, capacitor C9 of amplifier 603, similar to capacitors 110 and 210, blocks any DC component received from photodetector 501).

Figure 5B:
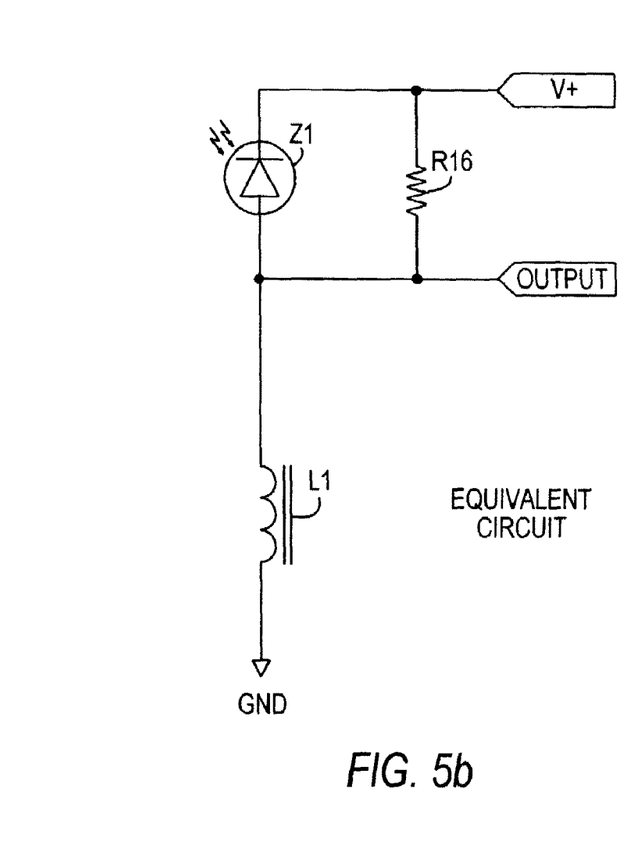

When artificial light hits photodiode Z1, photodiode Z1 produces an AC current having a frequency of at least about 120 Hz (which is typically the lowest frequency of common artificial light). Resistor R17 and capacitor C8 provide a 90° current phase shift to the base of transistor Q5 for frequencies greater than or equal to 120 Hz. Transistor Q5 provides an additional 180° current phase shift. Transistor Q5, resistor R17 and capacitance C8 are equivalent to an inductor L1, as shown in the equivalent circuit of FIG. 5b (as is known, inductors appear as short circuits to DC). The simulated inductor L1 provides a 90° phase shift between the voltage across the collector-emitter of transistor Q5 and the current through the same junction. Resistor R16 is included to provide a minimal amount of current when no ambient light is present (i.e., when the photodiode is not producing any DC current).

In one embodiment of the invention, photodiode Z1 is a "2506-02" or "1223" type diode, transistor Q5 is a "BC850" or equivalent type transistor, R16 is about 1M ohm. R17 is about 220k ohms, and C8 is about 1 µf.

Figure 6:
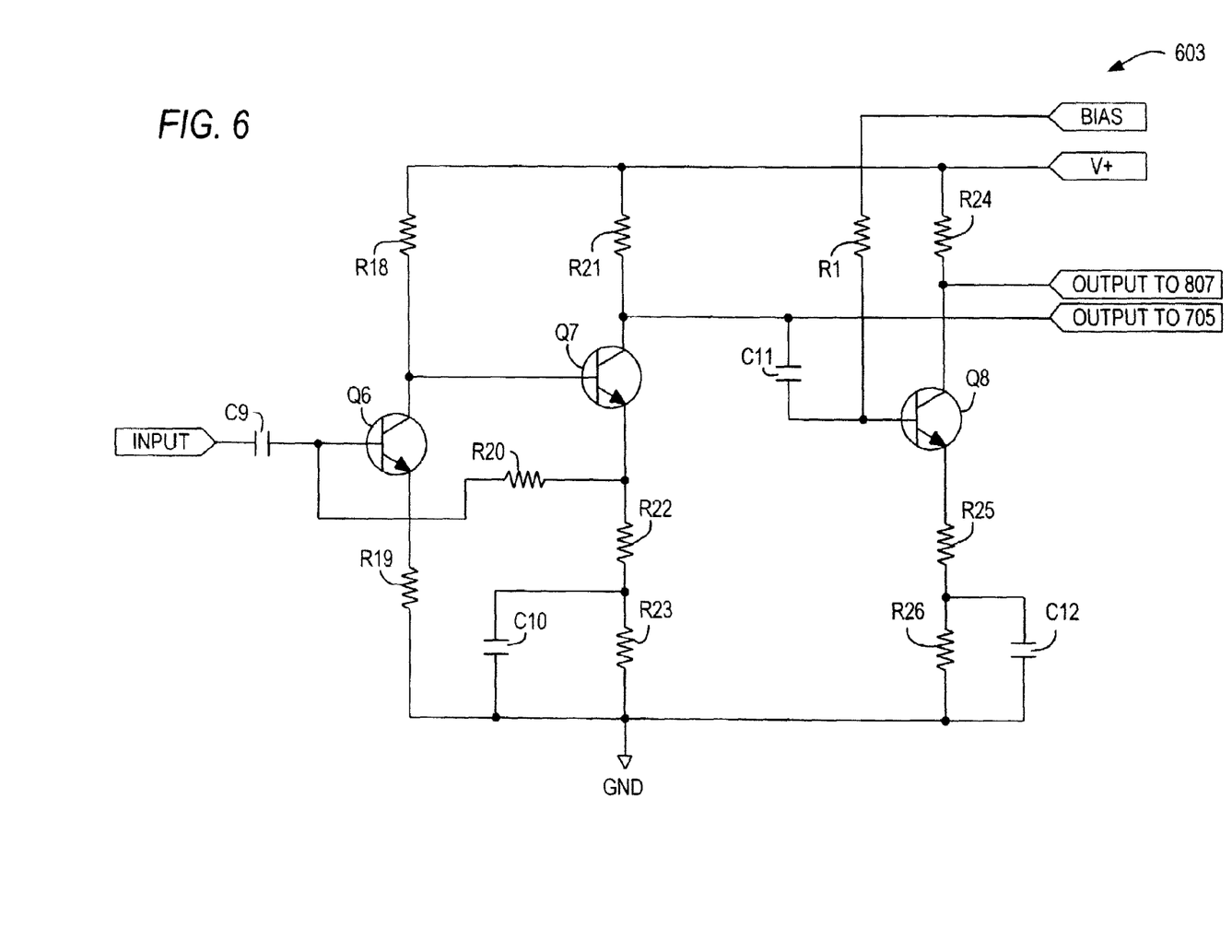
FIG. 6 is a circuit diagram of a second portion of the circuit of FIG. 4.

FIG. 6 shows amplifier 603, which includes NPN transistors Q6-Q8, capacitors C9-C12, and resistors R18-R26. Amplifier 603 is coupled to node V+ and receives a bias voltage from bias network 411 (see label "Bias"). Because the signal received from photodetector 501 is small, amplifier 603 amplifies the signal to a usable level. Transistors Q6 and Q7 form a standard direct coupled amplifier along with components R18-R23 and C10. The direct coupled amplifier reaches an equilibrium bias with about 0.5 volts on the base of Q6 and about 1.1 volts on the base of Q7 (also the collector of Q6). Resistors R22 and R23 set the bias current through Q7. The overall gain is set by using C10 to bypass R23.

Figure 7:
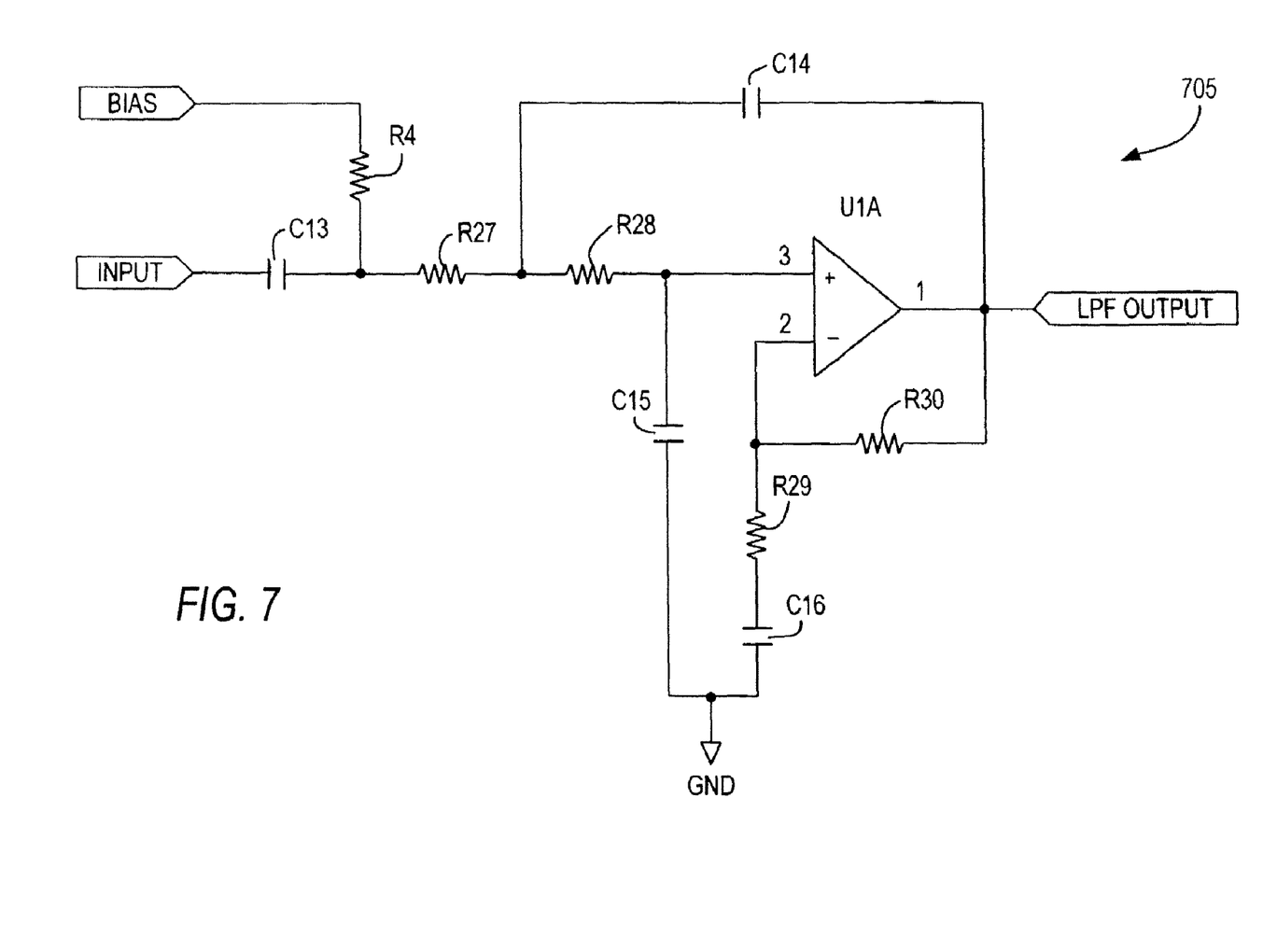
FIG. 7 is a circuit diagram of a third portion of the circuit of FIG. 4.

The first output of amplifier 603 is taken off the direct coupled amplifier and fed to the input of second order low pass filter 705, which determines whether incandescent or magnetic ballast (low frequency) lighting is present. Light from an incandescent or magnetic ballast source typically produces a signal at photodiode Z1 having a frequency of about 120 Hz. The gain characteristic for this output (in the mid band) can be described by:

$$\frac{V_{OutputLPF}}{V_{input}} \cong \frac{\beta_6 \beta_7 R18 R21}{(h_{ie6} + \beta_6 R19)(R18 + h_{ie7} + \beta_7 R22)}$$

Figure 8:
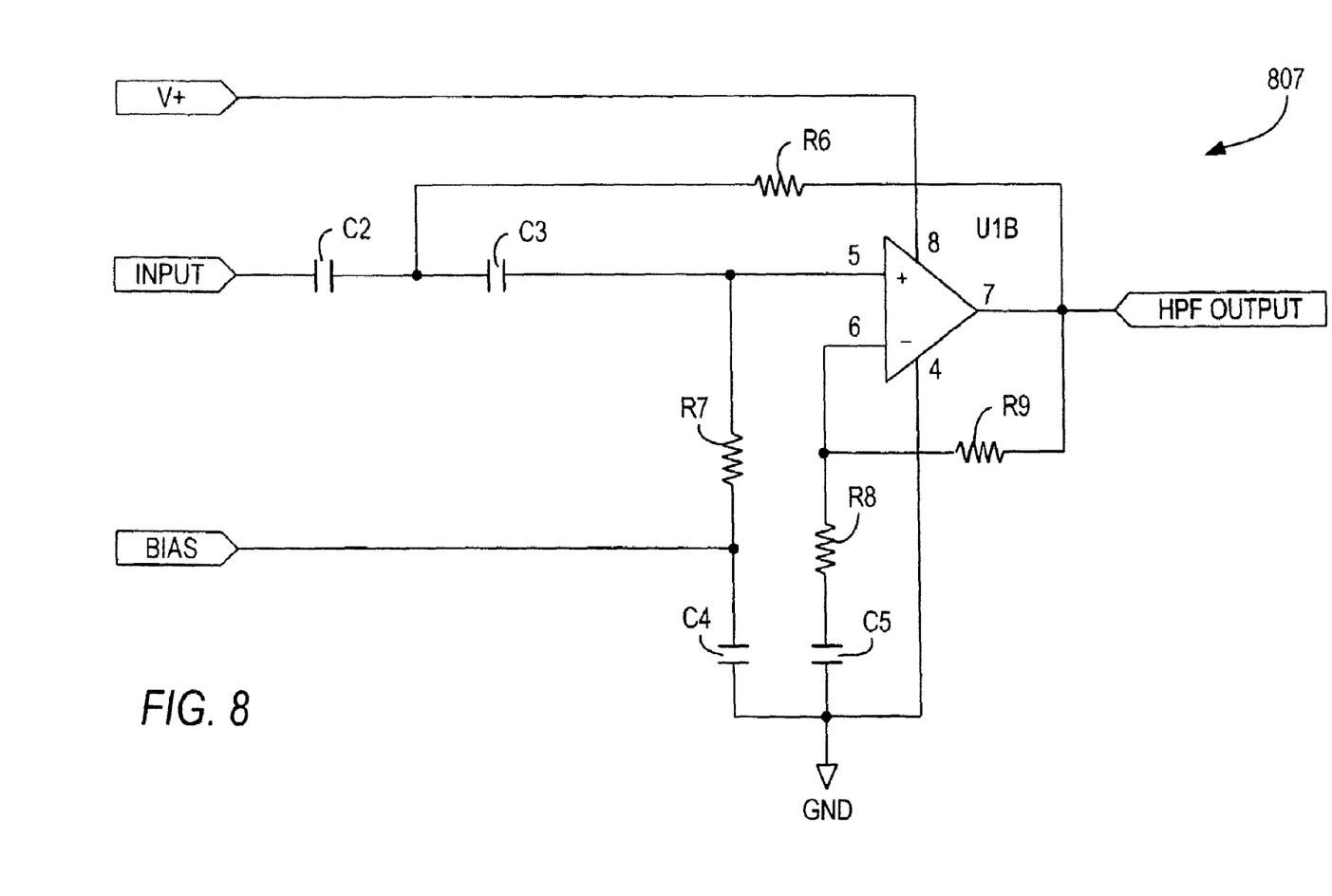
FIG. 8 is a circuit diagram of a fourth portion of the circuit of FIG. 4.

The second output of amplifier 603 is fed into the input of second order high bandpass filter 807, which determines whether high frequency light (e.g., from an electronic ballast) is present. Light from an electronic ballast produces a signal at photodiode Z1 having a frequency usually greater than about 30 kHz. Because of the characteristics of the photodiode, an additional amplification factor is necessary to balance the amplified signal outputs for the same amount of light produced by the two artificial light types. Therefore, the second output employs the standard direct coupled amplifier and transistor Q8, which forms a common-emitter amplifier along with components R1, R24, R25, R26, C11, and C12. The gain characteristics for the second output (in the mid band) can be described by:

$$\frac{V_{OutputHPF}}{V_{input}} \cong \frac{-\beta_6 \beta_7 \beta_8 R18 R21 R24}{(h_{ie6} + \beta_6 R19)(R18 + h_{ie7} + \beta_7 R22)(h_{ie8} + \beta_8 R25)}$$

Note that by choosing appropriate values for C11 and C12, the second output preferably only includes signal frequencies within the passband between 30 kHz and 100 kHz. This results in a modified gain characteristic for the second output that is closer to:

$$\frac{V_{OutputHPF}}{V_{input}} \cong 5 \cdot \frac{-\beta_6 \beta_7 R18 R21}{(h_{ie6} + \beta_6 R19)(R18 + h_{ie7} + \beta_7 R22)}$$

In one embodiment of the invention, transistors Q6-Q8 are each "BC850" or equivalent type transistors; C9 and C10 are each about 1 µf; C11 is about 47 pf; C12 is about 0.22 µf; R18, R24, and R25 are each about 47k ohms; R19 is about 360 ohms; R20 is about 750k ohms; R21 is about 22k ohms; R22, R23, and R25 are each about 4.7k ohms.

FIG. 7 shows second order low pass active source filter 705, which includes op-amp U1A, capacitors C13-16, and resistors R27-R30. As shown, filter 705 receives a bias voltage (see label "Bias") from bias network 411 and the first output from amplifier 603 (labeled "Input"). A complete description of an active source filter can be found in most electronics textbooks and/or specification sheets for most general purpose op-amps. The transfer function for this circuit has been repeated here for convenience.

$$H_{LPF}(s) = \frac{A_{CL}}{C_{14}C_{15}R_{27}R_{28}} \cdot \frac{1}{s^2 + s\left[\frac{1}{C_{14}R_{27}} + \frac{1}{C_{14}R_{28}} + (1-A_{CL})\frac{1}{C_{15}R_{28}}\right] + \frac{1}{C_{14}C_{15}R_{27}R_{28}}}$$

Where . . .

$$A_{CL} = 1 + \frac{R_{30}}{R_{29}}$$

By choosing appropriate values for R27, R28, R29, R30, C14 and C15, it is possible to obtain different filter types such as a Butterworth, Chebychev, or Bessel with a desired corner frequency. In this embodiment, a Chebychev filter with a corner frequency of 360 Hz is selected because of the sharp transition from the passband to the stopband. Accordingly, this filter allow signals with frequencies no larger than about 360 Hz to pass while attenuating signals with higher frequencies. This will allow detected light signals from an incandescent bulb or magnetic ballast to pass to the output of low pass filter 705, while attenuating light signals from electronic ballasts.

In one embodiment of the invention, op-amp U1A is an "LMV358" or equivalent type operational amplifier, C13 and C16 are each about 0.22 µf, C14 and C15 are each about 0.001 µf, R27 and R28 are each about 470k ohms, R29 is about 270k ohms, and R30 is about 220k ohms.

FIG. 8 shows second order high pass active source filter 807, which includes op-amp U1B, capacitors C2-C5, and resistors R6-R9. As shown, filter 807 receives a bias voltage (labeled "Bias") from bias network 411 and the second output from amplifier 603 (labeled "Input"). Again, a complete circuit description can be found in electronics handbooks or op-amp application reference. The transfer function for this type of filter is given for convenience.

$$H_{LPF}(s) = \frac{A_{CL}s^2}{s^2 + s\left[\frac{1}{C_2R_7} + \frac{1}{C_3R_7} + (1-A_{CL})\frac{1}{C_2R_6}\right] + \frac{1}{C_2C_3R_6R_7}}$$

Where . . .

$$A_{CL} = 1 + \frac{R_9}{R_8}$$

By choosing appropriate values for R6, R7, R8, R9, C2, and C3, it is possible to obtain many different high pass filter types with a designed corner frequency. To be consistent with filter 705, a Chebychev filter was chosen with a corner frequency of 30 kHz, because it offers a steeper transition from the stopband to the passband. Filter 807 attenuates signals with frequencies less than about 30 kHz and passes signals with higher frequencies. The highest signal frequency that this filter will pass is based on the characteristics of the op-amp used, and in this embodiment, is about 1 MHz. Accordingly, filter 807 is actually a bandpass filter that passes signals with frequencies between 30 kHz and 1 MHz. This allows signals generated from an electronic ballast to pass to the output of filter 807 (labeled "HPF Output"), while attenuating signals generated from an incandescent bulb or magnetic ballast.

In one embodiment of the invention, op-amp U1B is an "LMV358" or equivalent type operational amplifier, C2 and C3 are each about 47 pf, C4 is about 1 µf, C5 is about 0.22 µf, R6 and R7 are each about 100k ohms, R8 is about 270k ohms, and R9 is about 220k ohms.

Figure 9:
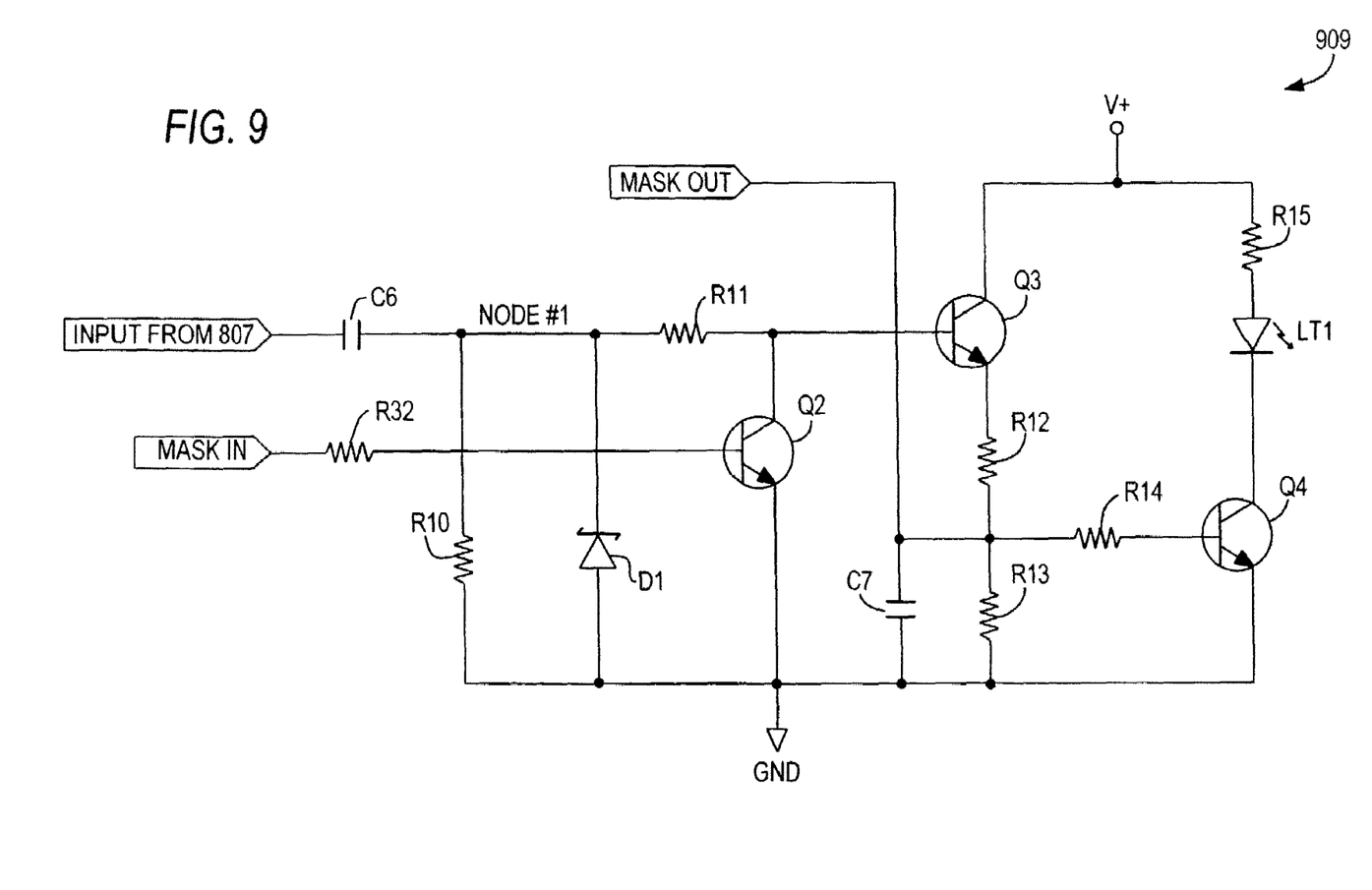
FIG. 9 is a circuit diagram of a fifth portion of the circuit of FIG. 4.
Figure 10:
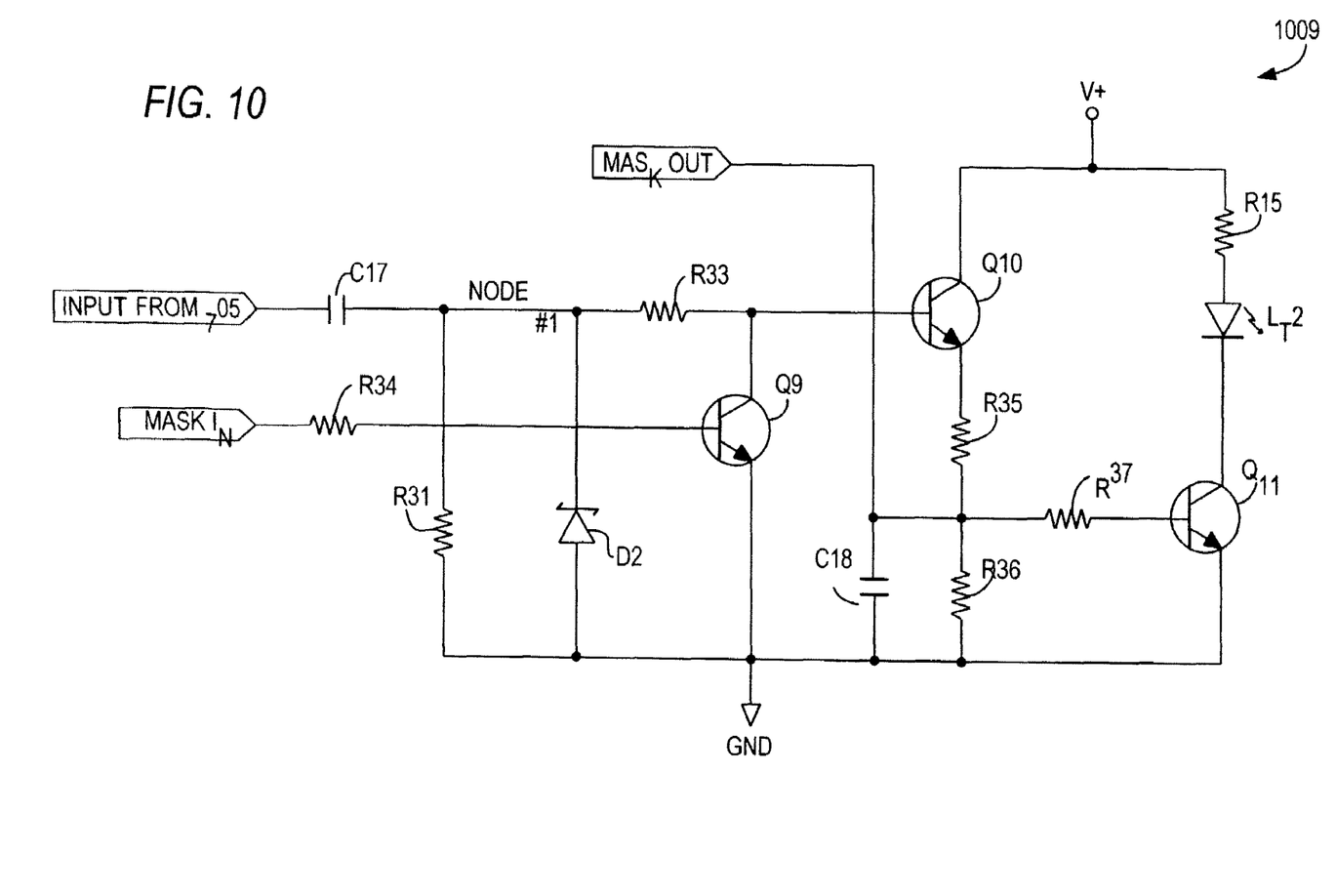
FIG. 10 is a circuit diagram of a sixth portion of the circuit of FIG. 4.

FIGS. 9 and 10 show identically-configured indicators 909 and 1009, respectively. Each indicator performs AC level shifting, amplitude demodulation (envelope detection), and light type identification via a light emitting diode (LED). Indicator 909 preferably includes NPN transistors Q2-Q4, Zener diode D1, capacitors C6 and C7, resistors R10-R14 and R32, and LED LT1. Indicator 1009 preferably includes NPN transistors Q9-Q11, Zener diode D2, capacitors C17 and C18, resistors R31 and R33-R36, and LED LT2. As shown more clearly in FIG. 4, resistor R15 is coupled to both indicators 909 and 1009. Indicator 909 receives signals passed by filter 807 (labeled "Input from 807"), while indicator 1009 receives signals passed by filter 705 (labeled "Input from 705"). The operation of indicators 909 and 1009 is preferably identical.

The AC level shifting function is performed by C6/C7, R10/R31, and D1/D2 (note that the left reference numeral refers to a component of indicator 909, while the right reference numeral refers to a component of indicator 1009). The signals from the outputs of filters 705 and 807 have both a DC component (resulting from the biasing of the op-amp) and the desired AC component passed by the respective filter. During the first few cycles of the passing AC waveform, D1/D2 turns on during the negative part of the cycles and clamps node #1 at preferably about −0.2 volts. During this time, D1/D2 provides a low impedance path allowing C6/C17 to charge to the minimum signal voltage out of its respective filter minus about −0.2 volts. This voltage charge across C6/C17 is necessary to level shift the AC signal at node #1 such that the signal's negative peaks are clamped at about −0.2 volts. Resistors R10/R31 provide a charge/discharge path for C6/C17 such that C6/C17 can adjust to different amplitude levels from each filter's output. This allows the signal strength of the artificial light being passed by the active filters to be measured.

The amplitude demodulation (envelope detection) function is performed by C7/C18, Q3/Q10, R12/R35, and R13/R36, and is a well known basic circuit. To avoid loading on the level shifter portion of the circuit, Q3/Q8 is used as a diode emitter follower to provide a large impedance. C7/C18 charges through R12/R35, and the net resulting voltage is the peak-to-peak voltage out of the level shifter portion minus the base-emitter drop across Q3/Q10. The voltage on C7/C18 represents the strength of the artificial light signal. If this voltage is about 0.55 volts or greater, components R14/R37 and Q4/Q11 cause the appropriate LED to illuminate, identifying the type of artificial light being detected. Preferably, each LED illuminates in a different color.

Substantially as one of the LEDs is about to be illuminated, the corresponding sensing envelope detector masks the opposing envelope detector so that only one LED can illuminate. This masking is performed by components R32/R34 and Q2/Q9 (note that in FIGS. 9 and 10, "Mask Out" of indicator 909 is "Mask In" of indicator 1009, and "Mask Out" of indicator 1009 is "Mask In" of indicator 909). Accordingly, if light detector circuit 400 is receiving both types of artificial light simultaneously, only the LED associated with the stronger of the two signals is permitted to illuminate.

In one embodiment of the invention, NPN transistors Q2-Q4 and Q9-Q11 are "2222" or equivalent type transistors, diodes D1/D2 are each "BAT54" or equivalent type diodes, capacitor C6 is about 330 pf and C17 is about 0.01 µf, capacitors C7/C18 are each about 0.22 µf, resistors R10/R31 are each about 2.7M ohm, resistors R11/R33 are each about 1k ohms, resistors R12/R35 are each about 470 ohms, resistors R13/R36 are each about 470k ohms, resistors R14/R37 and R32/R34 are each about 27k ohms, and resistors R15 is about 180 ohms.

Note that the dashed boundary lines in FIG. 4 and the components shown in each of FIGS. 5a-10 are merely illustrative and are not meant to rigidly define every component in each circuit described above. For example, although capacitor C13 is shown in FIG. 4 as being part of amplifier 603, it may be more appropriately considered to be a part of low pass filter 705, as shown in FIG. 7. Similarly, although resistor R1 is shown to be part of amplifier 603 in FIG. 6, it may be more appropriately considered to be a part of bias network 411, as shown in FIG. 4. Furthermore, as is known in the art, circuit modifications can be made to the circuits described above without departing from the spirit and scope of the invention. Thus, the invention is not limited to only those circuit configurations and component values shown and described.

Also note that although individual LEDs (preferably emitting different colors or emitting light through different colored lens) have been shown to respectively indicate the type of light detected, other light emitting devices and light-indicating techniques can be used. For example, a single LED or other light emitting device that can blink at different rates to indicate respectively different conditions (e.g., types of artificial light detected) or that can emit a steady light for one condition and then blink for another condition can be used.

Figure 11:
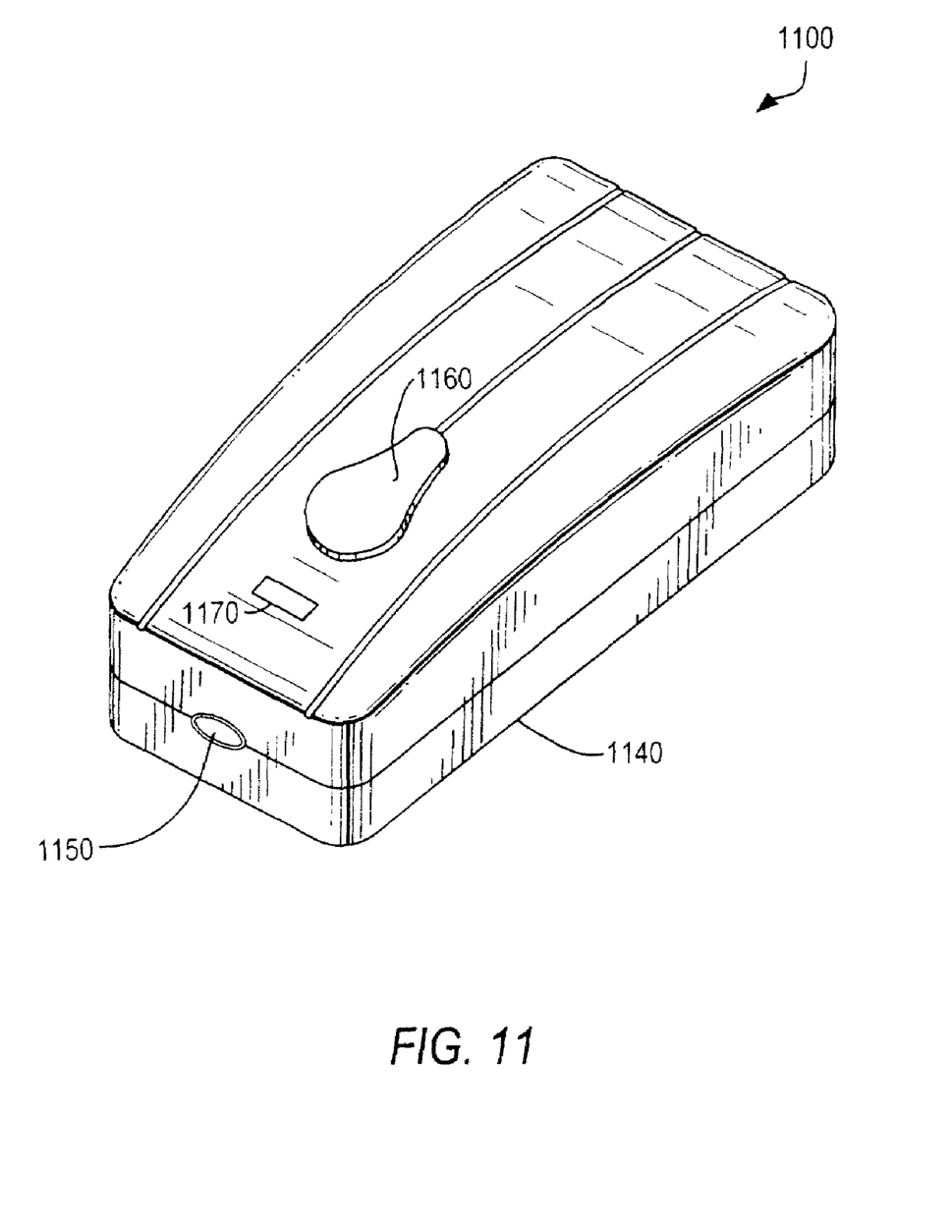
FIG. 11 is a perspective view of a portable, handheld artificial light detector according to the invention.
Figure 12:
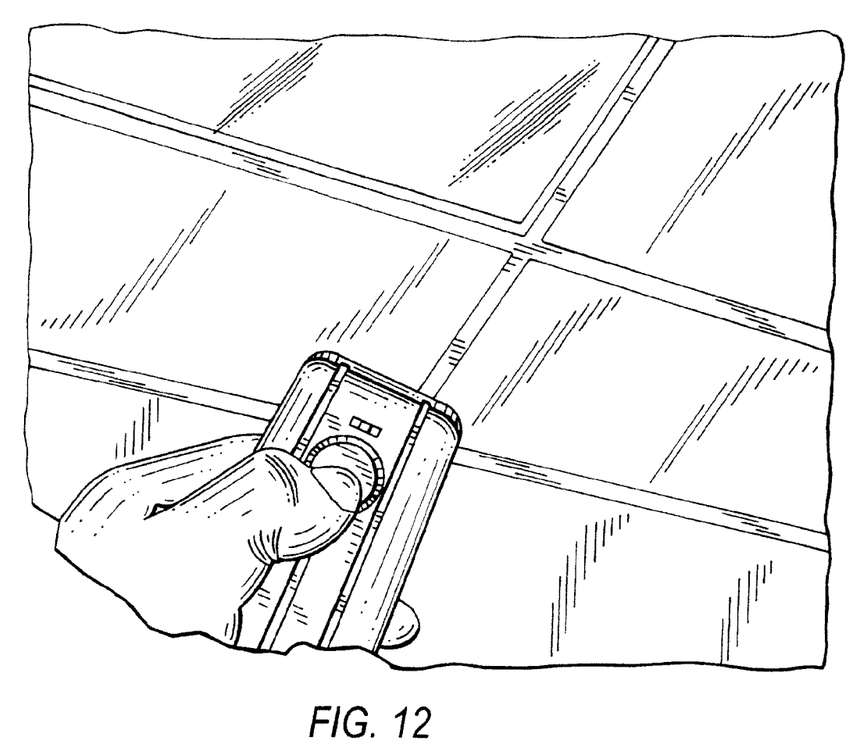
FIG. 12 is another perspective view of the light detector of FIG. 11.

FIG. 11 shows a portable, handheld light detector in accordance with the invention. Detector 1100 may incorporate any one of detector circuits 100, 200, 300, or 400. Light detector 1100 has a preferably rigid body 1140, an aperture 1150 for receiving light, a manually-operated push-button power switch 1160, and an indicator window 1170. Body 1140 is preferably made of a suitable plastic and may be fabricated in two halves attached together via screws through the bottom of body 1140. Alternatively, body 1140 may be made of other suitable materials or combinations of suitable materials. Power switch 1160 is preferably of the type that connects power to the detector circuitry only while continuously depressed. In other words, release of switch 1160 disconnects power from the detector circuitry. This prevents the detector from being accidently left in a powered-on state and thus conserves power, increasing the life of the portable energy source. One embodiment of light detector 1100 advantageously measures about 4" (10 cm) long by about 2" (5 cm) wide by about 1" (2.5 cm) thick, which can be easily carried in a shirt pocket and easily held, aimed, and operated in one hand, as shown in FIG. 12.

To operate detector 1100, a user simply aims the detector at a luminaire and depresses and holds the power switch. Detector 1100 then identifies the type of light detected via different colored illuminations at window 1170. For example, if artificial light from an electronic ballast is being detected, a green illumination at window 1170 may be seen. If artificial light from a magnetic ballast or incandescent lamp is being detected, an orange or red illumination at window 1170 may be seen. If sunlight, light from a DC source (e.g., a battery-operated flashlight), or no light is being detected, no illumination at window 1170 is seen. Detectors of the invention advantageously allow an auditor to save significant time and effort during a survey of existing lighting.

Note that although light emitting devices have been shown to indicate the type of light detected, other types of devices can be used instead. For example, devices that emit different sounds or a different number of sounds can be used to identify types of detected light. Moreover, any other known method of identifying two or more conditions can be used to identify types of artificial light in accordance with the invention.

As mentioned above with respect to light detector 300, artificial light detectors of the invention are not limited to identifying only two frequency ranges of detected light. Alternatively, other embodiments can have multiple signal filters and a corresponding number of indicators (or corresponding indication technique). Such other embodiments can be used to identify different types of light having a number of particular frequencies or frequency ranges.

Thus it is seen that light detectors capable of distinguishing artificial light from sunlight and low-frequency artificial light from high-frequency artificial light are provided. One skilled in the art will appreciate that the invention can be practiced by other than the described embodiments, which are presented for purposes of illustration and not of limitation, and the invention is limited only by the claims which follow.

We claim:

1. A light detector comprising:
a first filter coupled to receive an electrical signal representing received light and to output a first filtered signal;
a second filter coupled to receive in parallel the same electrical signal as the first filter and to output a second filtered signal, the first filtered signal causing a first type of light to be indicated by the light detector unless the second filtered signal is stronger, and the second filtered signal causing a second type of light to be indicated by the light detector unless the first filtered signal is stronger;
a portable, self-contained energy source to power the first filter and the second filter; and
a housing dimensioned to enclose only said light detector.

2. The detector of claim 1 further comprising a manually-operated switch coupled between said energy source and said first filter and second filter, said manually-operated switch connecting power from the energy source to the first filter and second filter only while being continuously manually engaged.

3. The detector of claim 1 wherein said housing has a length of about 4 inches (10 cm), a width of about 2 inches (5 cm), and a thickness of about 1 inch (2.5 cm).

4. The detector of claim 1 further comprising a light emitting diode to indicate one of the first and second types of light.

5. The detector of claim 1 wherein the first filter passes signals in a first frequency range and the second filter passes signals in a second non-overlapping frequency range, the second frequency range higher than the first frequency range.

6. The detector of claim 1 wherein the housing physically isolates said light detector from external electrical connections.

7. The detector of claim 1 wherein the portable, self-contained energy source comprises two 1.5 volt double A batteries.

8. A light detector comprising:
a photodetector operative to convert received light into an electrical signal;
an amplifier coupled to said photodetector, said amplifier operative to amplify an output signal of said photodetector;
a first filter coupled to receive an output signal of said amplifier;
a first indicator coupled to an output of said first filter;
a second filter coupled to receive an output signal of said amplifier;
a second indicator coupled to an output of said second filter; and
an energy source to power said amplifier, first filter, second filter, first indicator, and second indicator;
wherein the first indicator comprises first envelope detection circuitry and the second indicator comprises second envelope detection circuitry, the first and second envelope detection circuitries coupled to each other to prevent both the first and second indicators from activating simultaneously, the first envelope detection circuitry generating a first voltage in response to a first type of light received and the second envelope detection circuitry generating a second voltage in response to a second type of light received simultaneously with the first type of light, the first or second envelope detection circuitry with the higher voltage disabling the other envelope detection circuitry.

9. The detector of claim 8 further wherein said energy source is portable and self-contained within the detector.

10. The detector of claim 8 wherein said photodetector comprises a photodiode.

11. The detector of claim 8 wherein said output signal of said photodetector comprises only an alternating current component of said electrical signal.

12. The detector of claim 8 wherein said first filter comprises a low pass filter.

13. The detector of claim 8 wherein the first indicator comprises a first light emitting diode and the second indicator comprises a second light emitting diode.

14. A light detector comprising:
a first filter coupled to receive an electrical signal representing received light;
a first indicator coupled to receive an output signal of said first filter;
a second filter coupled to receive in parallel the same electrical signal as the first filter;
a second indicator coupled to receive an output signal of said second filter, the first indicator causing the output of the second filter to be masked from the second indicator in response to the output signal of the first filter being stronger than the output signal of the second filter, and the second indicator causing the output of the first filter to be masked from the first indicator in response to the output signal of the second filter being stronger than the output signal of the first filter; and a housing dimensioned to be handheld in which said first filter, second filter, first indicator, and second indicator are enclosed, said housing physically isolating said light detector from external electrical power connections.

15. The detector of claim 14 further comprising an energy source self-contained within the detector.

16. The detector of claim 15 further comprising a manually-operated switch between said energy source and said first filter, second filter, first indicator, and second indicator.

17. The detector of claim 16 wherein the manually-operated switch connects power from the energy source to the first filter, second filter, first indicator, and second indicator only while being continuously manually engaged.

18. The detector of claim 14 wherein said second filter comprises a bandpass filter.

19. The detector of claim 14 wherein either said first or second indicator comprises a sound generating device.

20. The detector of claim 14 wherein the housing has a window through which each of the first and second indicators is respectively identifiable when activated.

* * * * *